United States Patent [19]
Murray et al.

[11] Patent Number: 6,077,461
[45] Date of Patent: Jun. 20, 2000

[54] CATIONIC CHEMILUMINESCENT MONOMERS AND POLYMERS

[75] Inventors: Patrick G. Murray, Yorkville; Amy M. Tseng, Woodridge, both of Ill.; Don Sproul, Tuscon, Ariz.

[73] Assignee: Nalco Chemical Company, Naperville, Ill.

[21] Appl. No.: 09/164,045

[22] Filed: Sep. 30, 1998

[51] Int. Cl.[7] .............................. C09K 3/00; G01N 21/76; C08F 26/08; C07D 237/30
[52] U.S. Cl. ......................... 252/700; 436/172; 526/258; 526/264; 544/237
[58] Field of Search ............................... 252/700; 362/34; 436/172; 526/258, 264; 544/237

[56] References Cited

U.S. PATENT DOCUMENTS

| | | |
|---|---|---|
| 4,783,314 | 11/1988 | Hoots et al. . |
| 4,813,973 | 3/1989 | Winnik et al. . |
| 5,003,050 | 3/1991 | Kiel et al. . |
| 5,171,450 | 12/1992 | Hoots . |
| 5,435,969 | 7/1995 | Hoots et al. . |
| 5,645,799 | 7/1997 | Shah et al. . |
| 5,705,394 | 1/1998 | Ananthasubramanian et al. . |

FOREIGN PATENT DOCUMENTS

| | | |
|---|---|---|
| 58-137759 | 8/1983 | Japan . |
| 05034330 | 2/1993 | Japan . |
| 9-302033 | 11/1997 | Japan . |
| 1141147 | 12/1965 | United Kingdom . |

OTHER PUBLICATIONS

Omote et al., Bulletin of The Chemical Society of Japan, vol. 40, pp. 1693–1695, (1967).

Abruna et al., Journal of The American Chemical Society, vol. 104, pp. 2641–2642, (1982).

*Primary Examiner*—Philip Tucker
*Attorney, Agent, or Firm*—Michael B. Martin; Thomas M. Breininger

[57] ABSTRACT

Luminol derived monomers, and luminol derived water-treatment polymers formed from the luminol derived monomers, as well as methods for monitoring of the chemiluminescence of such water-treatment polymers are disclosed. The novel chemiluminescent polymers require only a very low level of incorporation of the chemiluminescent moiety, and are useful for monitoring, even in systems containing impurities which either quench fluorescence or fluoresce themselves.

22 Claims, No Drawings

CATIONIC CHEMILUMINESCENT MONOMERS AND POLYMERS

FIELD OF THE INVENTION

Luminol derived monomers, and water-soluble polymers formed using the luminol derived monomers, as well as methods for monitoring of the chemiluminescence of such polymers are disclosed. The novel chemiluminescent polymers require only a very low level of incorporation of the chemiluminescent moiety, and are useful for monitoring the location and concentration of such polymers, even in systems containing impurities which either quench fluorescence or fluoresce themselves.

BACKGROUND OF THE INVENTION

The present invention relates generally to the treatment and monitoring of industrial systems and, more specifically, to the treatment and monitoring of industrial systems using luminol-tagged polymers in combination with fluorescent or chemiluminescent detection techniques.

The ability to track the polymer location and concentration in industrial systems is highly desirable. Typically, these processes are complex and dynamic, and therefore the means to monitor the polymeric coagulant or flocculent can result in increases in efficiency of the chemical treatment program, allow for diagnostic troubleshooting, insure that regulatory discharge limits are met, and may allow for automated control of the polymer treatment program by relating the monitoring parameter to some other system parameter of interest, for example, drainage rate or turbidity reduction. The industries in which such water soluble polymers are used include papermaking, mining and mineral process, sludge dewatering, and oil recovery, for example. Water soluble polymers of the type described herein are also used extensively to treat water used for steam generation (boilers) and cooling, among other things.

The typical approach to monitoring the level of water soluble polymer coagulants or flocculants in a system has been to blend fluorescent dyes with the polymer program in small amounts and to use the fluorescence of the mixture to determine the concentration of the polymer in the system, as exemplified by U.S. Pat. Nos. 4,783,314; 5,645,799 and 5,435,969, the disclosures of which are hereby incorporated by reference.

Another approach involves the preparation of "tagged" polymers, wherein a fluorescent moiety is covalently attached to the polymer, either during or after the polymerization, and then utilized for fluorescence monitoring and dosage control. This approach is described in U.S. Pat. Nos. 4,813,973, 5,171,450 and 5,705,394, the disclosures of which are also hereby incorporated by reference. Fluorescent compounds incorporated into monomers have also been disclosed in GB 1,141,147. This approach is advantageous in that the detection of flourescence positively indicates the presence of the polymeric additive. While both approaches for monitoring fluorescence have been relatively successful, they have limitations. Many aqueous systems wherein water soluble polymers are utilized often contain other sources of fluorescence. Therefore, the use of a fluorescent marker may be impractical, as it becomes difficult to reliably distinguish low levels of fluorescence from the polymeric species against high levels of fluorescence arising from the process stream or waste water. Moreover, such process waters oftentimes contain substances which may not be fluorescent themselves, but which will quench the fluorescence of other species in the system, including the fluorescence of the traced or tagged polymer additive. This also makes reliable detection of the polymer additive difficult or impossible. Finally, if the levels of the background fluorescence or the quenching materials fluctuate, this renders useless automated control schemes based on the calibration of a fluorescent response.

Accordingly, there is a need for a polymer that can be modified with a marker chemically incorporated into or otherwise attached to the polymer. Because the marker and polymer would be physically attached, detection of the marker would necessarily result in a detection of the polymer. Of course, it would be economically important that the marker be readily detectable at low concentrations. A chemiluminescent marker would therefore be desirable, since chemiluminescence is based upon a non-irradiative excitation process, and therefore is not subject to the same limitations of fluorescence-based monitoring techniques already discussed. Further, for widespread applicability, a water soluble polymer is required. Accordingly, there is a need for a modified water soluble polymer in which the marker is highly chemiluminescent and which could be readily detected in the part per million (ppm) or part per billion (ppb) range using existing chemiluminescent techniques.

Luminescent labels are attractive candidates for use as markers for a variety of reasons. Chemiluminescence is broadly defined as the production of visible light by atoms that have been excited by the energy produced in a chemical reaction, usually without an associated production of heat. Chemical energy excites electrons in the light-emitting molecules to higher energy states, from which electrons eventually fall to lower energy states with the emission of quanta of energy in the form of visible light. Luminescence is observed in several synthetic chemical compounds and also in naturally occurring biological compounds such as found in some bacteria, fireflies and certain varieties of marine life.

One of the most important families of chemiluminescent molecules are the phthalhydrazides. The most familiar member of this family is luminol, or 5-amino-2,3-dihydro-1,4-phthalazinedione, which has a chemical composition of $C_8H_7N_3O_2$ and a double ring structure with a melting point of about 320° C. Luminol is commercially available from several suppliers and is well characterized. Certain luminol analogs are also chemiluminescent, such as those wherein the position of the amino group is shifted (e.g., isoluminol, the amino group being at the 6 position), or is replaced by other substituents, as well as annelated derivatives and those with substitution in the non-heterocyclic ring. Some luminol analogs produce light more efficiently than does luminol itself, while others have lower efficiency. (As used herein, the term "luminol" encompasses such related species.)

Generally, luminol produces light in an oxidizing reaction, wherein the luminol combines with oxygen or an oxidizer to produce a reaction product and photons at a wavelength of about 425–450 nanometers (nm). The precise reaction formula and the quantum efficiency of light production, i.e., the ratio of luminescing molecules to total molecules of the luminescent species, depend upon the medium in which the luminol resides, temperature and other reaction conditions. Typical oxidizers used in conjunction with luminol include oxygen, hydrogen peroxide, hypochlorite, iodine and permanganate.

The oxidation of luminol with the associated production of light occurs rather slowly at ambient temperatures, unless the reaction is catalyzed. A variety of different substances can catalyze the reaction, including organic enzymes, such as horseradish peroxidase, other organic molecules such as microperoxidase and heme, positively charged metallic ions such as the cupric ion, and negatively charged ions such as the ferricyanate ion among others.

Luminol has been diazo-linked to hydroxyindole to form water-soluble luminescent compounds having repeating units, for use in immunoassays as described in U.S. Pat. No. 5,003,050. Moreover, post-polymerization modification of water-soluble polymers with luminol to produce filling agents or immunologically active complexes for quantitative assays was disclosed in JP 58137759A and JP 05034330. However, therein structurally different polymers were first formed, and luminol was afterwards attached, in contrast to the instant invention wherein luminol is incorporated into a monomer prior to polymerization.

Luminescent molecules would appear to be highly desirable as markers because of their stability, sensitivity, the potential ease of detecting their emitted visible light and their lack of toxicity.

There is a need for a luminescent water treatment agent which is water soluble, is highly quantum efficient, and provides long-lived chemiluminescence. Accordingly, it is an object of the present invention to provide a water-soluble luminescent water treatment agent. The inventors have discovered that use of a luminol derived marker, incorporated into a polymeric water treatment agent by free radical polymerization of luminol derived monomers achieves such goals. The novel chemiluminescent polymers will have utility for polymer detection, product fate determination and dosage control. Moreover, since emission is chemically induced, no photo excitation source is used, and fluorescence resulting from other components or contaminants of the system to be treated will not interfere with quantitation. Moreover, since chemiluminescence may be detected at very low levels, the tagged polymers disclosed herein provide the additional advantage of more exact quantitation.

Other objects, aspects and advantages of the present invention will be apparent to those skilled in the art from a reading of the following detailed disclosure of the invention.

SUMMARY OF THE INVENTION

Luminol derived monomers, and water soluble, water-treatment polymers formed using the luminol derived monomers, as well as methods for monitoring of the chemiluminescence of such water-treatment polymers are disclosed. The novel chemiluminescent polymers require only a very low level of incorporation of the chemiluminescent moiety, and are useful for monitoring, even in systems containing impurities which either quench fluorescence or fluoresce themselves.

DESCRIPTION OF THE INVENTION

The polymers which could be manufactured using the present invention include all water-soluble polymers which are prepared by free radical polymerization. Such chemiluminescent polymers could be non-ionic, cationic, or anionic, depending upon the monomers which are selected to be copolymerized with the described luminol-derived monomer. The polymers may be low, medium or high molecular weight, depending upon the conditions of the polymerization. The polymers may be prepared as solution, dispersion, inverse emulsion, or as gel polymers.

When a water-soluble polymer has been made chemiluminescent (tagged or "marked") by virtue of incorporation of the chemiluminescent monomer, then a means for detecting the polymer is provided for. Specifically, the polymer can be detected in water samples by treating the water sample with the proper reagents, in the presence of a light-sensitive detector, and observing the emission of light. This detection process may be manual, wherein a water sample is removed from a process stream and analyzed as described, or it may be continuous, wherein a sidestream from a process is diverted and mixed with the activating reagents just before encountering an in-line detector. The concentration of the polymer in the stream can then be determined, since the observed luminescent intensity is proportional to polymer concentration. Once known, the polymer concentration can be used to control and optimize various aspects of the process which are related to polymer dosage.

Alternately, determining the location and concentration of the polymer in post-process streams, water recycle loops, and effluent discharge pathways can be useful for regulatory compliance, product fate determination or environmental monitoring, and can be accomplished in the same manner.

The monomers and polymers described herein are also fluorescent, and so could be detected using an excitation light source in conjunction with an emission detector. Under these circumstances, no additional reagents need be added to the water sample containing the tagged polymer prior to detection. However, as has been discussed, chemiluminescent detection provides a number of advantages over fluorescent detection, and so is the preferred method.

When used to treat industrial waters, the dosage of the modified polymers should usually vary from a few parts per million (ppm) up to several hundred ppm depending upon the system to be treated and the intrinsic viscosity of the polymeric agent utilized.

When used as a coagulant, the dosage should typically be between a few ppm up to approximately 100 ppm.

While as great a mole ratio of amide-linked chemiluminescent monomer can be incorporated into a polymer treatment agent as desired, one advantage of this invention is that due to the sensitivity of chemiluminescent techniques, only a very small amount of incorporation of the chemiluminescent moiety is actually necessary. Furthermore, the incorporation of only a very low percentage of chemiluminescence insures that the efficiency of the treatment polymer will not be modified.

It is envisaged that with proper selection of vinylic monomers, chemiluminescent polymers for use in non-aqueous systems can be formed.

One aspect of this invention is a chemiluminescent monomer compound comprising: a vinylic monomer having a pendant amide-linked chemiluminescent group.

For the practice of any aspect of this invention, the following applies. The chemiluminescent monomer may be formed from reaction of a vinylic monomer having a terminal amine group with an alpha-haloacetyl containing chemiluminescent group. The chemiluminescent group may be selected from the group consisting of: 5-amino-2,3-dihydro-1,4-phthalazinedione, 6-amino-2,3-dihydro-1,4-phthalazinedione and N-(4-aminobutyl)-N-ethyl-6-amino-2,3-dihydro-1,4-phthalazinedione. The monomer may be of the formula

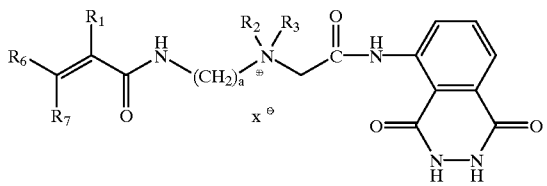

wherein a is an integer of from 1 to 10, $R_1$, $R_6$ and $R_7$ are selected from the group consisting of hydrogen and methyl groups, $R_2$ and $R_3$ are methyl groups and X is selected from the group consisting of chloride, iodide and bromide ions. More specifically, the monomer may be N,N-dimethylaminopropylmethacrylamide N-(chloroacetyl)-3-aminophthalhydrazide quaternary salt. Alternatively, the monomer may be of the formula

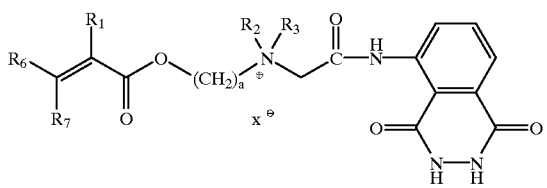

wherein a is an integer of from 1 to 10, $R_1$, $R_6$, and $R_7$ are selected from the group consisting of hydrogen and methyl groups, $R_2$ and $R_3$ are methyl groups and X is selected from the group consisting of chloride, iodide and bromide ions. The vinylic monomer having a terminal amine group may be selected from the group consisting of: dimethylaminoethyl acrylate and dimethylaminoethyl methacrylate.

Another aspect of the invention is a chemiluminescent water-soluble or water-dispersible polymer compound comprising: a chemiluminescent water-soluble polymer formed from free radical polymerization of at least a first chemiluminescent vinylic monomer and a second vinylic monomer, wherein said first monomer has a pendant amide-linked chemiluminescent group.

The following information may apply to any aspect of this invention. The first monomer may be formed from reaction of a vinylic monomer having a terminal amine group with an alpha-halo acetyl containing chemiluminescent group. The second monomer may be selected from the group consisting of: acrylamide, acrylic acid, methacrylamide, vinyl acetate, dimethylaminoethyl acrylate methyl chloride quaternary salt, dimethylaminoethyl acrylate cetyl chloride quaternary salt, dimethylaminoethyl acrylate benzyl chloride quaternary salt, diallyldimethyl ammonium chloride, N-vinyl formamide, 2-acrylamido-2-methylpropane sulfonic acid, dimethylaminoethyl methacrylate methyl chloride quaternary salt, dimethylaminoethyl methacrylate cetyl chloride quaternary salt, dimethylaminoethyl methacrylate benzyl chloride quaternary salt, methacrylamidopropyl trimethyl ammonium chloride, acrylamidopropyl trimethyl ammonium chloride and combinations thereof.

The polymer may have a luminescent repeating mer unit represented by the formula

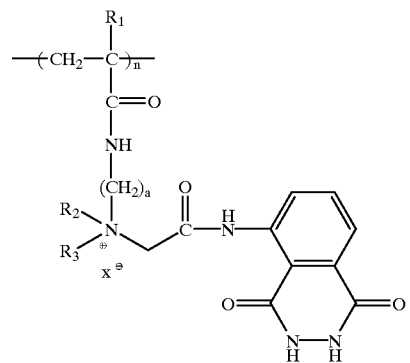

wherein a is an integer of from 1 to 10, $R_1$ is selected from the group consisting of hydrogen and methyl groups, $R_2$ and $R_3$ are methyl groups and X is selected from the group consisting of chloride, iodide and bromide ions and wherein said polymer also contains a remaining portion of randomly distributed vinylic mer units.

Alternatively, the polymer may have a luminescent repeating mer unit represented by the formula

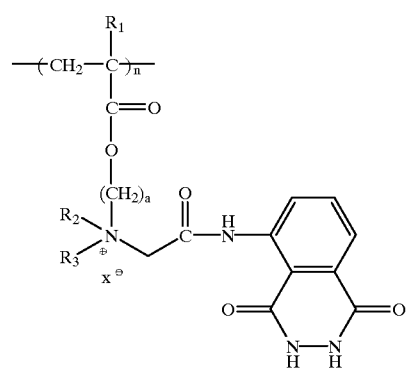

wherein a is an integer of from 1 to 10, $R_1$ is selected from the group consisting of hydrogen and methyl groups, $R_2$ and $R_3$ are methyl groups and X is selected from the group consisting of chloride, iodide and bromide ions and wherein said polymer also contains a remaining portion of randomly distributed vinylic mer units.

The vinylic mer units may be derived from monomers selected from the group consisting of acrylamide, acrylic acid, methacrylamide, vinyl acetate, dimethylaminoethyl acrylate methyl chloride quaternary salt, dimethylaminoethyl acrylate cetyl chloride quaternary salt, dimethylaminoethyl acrylate benzyl chloride quaternary salt, diallyldimethyl ammonium chloride, N-vinyl formamide, 2-acrylamido-2-methylpropane sulfonic acid, dimethylaminoethyl methacrylate methyl chloride quaternary salt, dimethylaminoethyl methacrylate cetyl chloride quaternary salt, dimethylaminoethyl methacrylate benzyl chloride quaternary salt, methacrylamidopropyl trimethyl ammonium chloride, acrylamidopropyl trimethyl ammonium chloride and combinations thereof.

The luminescent mer unit may be from about 0.001 to about 10 mole percent of said polymer, and said vinylic mer unit is from about 90 to 99.999 mole percent of said polymer. Specifically, the polymer may be poly(acrylamide/dimethylaminoethylacrylate benzyl chloride quaternary salt/N,N-dimethylaminopropylmethacrylamide N-(chloroacetyl)-3-aminophthalhydrazide quaternary salt.

Another aspect of this invention is a method for increasing the efficiency of a water-soluble or water-dispersible polymeric flocculating agent in a fluid stream containing solids comprising the steps of:
a) incorporating a detectable chemiluminescent moiety into said polymeric agent by polymerizing one or more vinylic monomers to form said agent under free radical polymerization conditions, wherein at least one of said vinylic monomers has an amide-linked chemiluminescent pendant group, to form a chemiluminescent polymer;
b) adding an effective flocculating amount of said chemiluminescent agent to said fluid stream;
c) flocculating said solids from said solids containing stream to form a clarified stream;
d) separating flocculated solids from said clarified fluid stream; and then,
e) determining amount of chemiluminescent agent present in said clarified stream with chemiluminescent analytical techniques, whereby concentration of said agent in said clarified stream indicates that a modification in dosage selected from the group consisting of increasing, decreasing and not changing said dosage should be made.

As used herein the term acrylamide is meant to also encompass substituted acrylamides. The terms tagged and marked have been used interchangeably, and are meant to describe a luminescent moiety chemically bonded to a monomer, which monomer is subsequently incorporated into the backbone of a polymer under free radical polymerization conditions. The term "n" as utilized herein signifies that a unit described within parentheses repeats, and is not intended to indicate any specific or definite numerical range for the number of repeat units.

In the Examples which follow, aspects of the present invention, an amide-linked chemiluminescent polymer, useful for the treatment of industrial waters are illustrated. Specifically, the luminol-tagged polymers made in accordance with the present invention can be used to monitor treated water residuals, control polymeric agent addition, and be used in the analysis of mechanisms of polymeric treatment agent action. By improving the detectability of polymeric agents and by improving the ability to control the dosage levels of these agents, the present invention allows polymeric agents to be utilized more efficiently, as chemiluminescent monitoring can indicate whether or not more water-treatment agent is necessary, or in fact if a lower dosage may have been adequate.

The following examples are presented to describe preferred embodiments and utilities of the invention and are not meant to limit the invention unless otherwise stated in the claims appended hereto.

EXAMPLE 1

The precursor to the luminol containing monomer, N-(chloroacetyl)-3-aminophthalhydrazide, was prepared in the following manner: 3-Aminophthalhydrazide ("luminol", Aldrich, Milwaukee, Wis.), 5.0 g (0.0282 mol), was suspended in 50 mL of dimethylformamide in a 100 mL round bottom flask containing a magnetic stirring bar. Chloroacetic anhydride (Aldrich), 7.2 g (0.0421), was added, and the mixture was heated to 50° C. with stirring for four hours. After this time, the reaction mixture was poured into 100 mL of cold water, and the precipitate which formed was collected by filtration. After washing with two 50 mL portions of cold water and drying, 7.2 g of a yellow powder was obtained (quantitative yield).

EXAMPLE 2

An alternate procedure for the preparation of N-(chloroacetyl)-3-aminophthalhydrazide is as follows. 3-Aminophthalhydrazide (Aldrich), 5.0 g (0.0282 mol), was dissolved in 50 mL of dimethylformamide in a 100 mL round bottom flask containing a magnetic stirring bar. Triethylamine, 2.85 g, was added to the flask, and then chloroacetyl chloride (Aldrich), 3.34 g (0.0296), was added dropwise over 15 minutes. After the addition of the acid chloride was complete, the mixture was stirred for 30 minutes at room temperature. Triethylamine hydrochloride is formed during this time and precipitates from solution. After thirty minutes, the reaction mixture was poured into cold water, and the precipitate which formed was collected by filtration. After washing sequentially with 50 mL portions of cold water and then ethyl ether, and drying, 5.6 g (78 % yield) of a yellow powder was obtained.

EXAMPLE 3

A monomer, the N-(chloroacetyl)-3-aminophthalhydrazide quaternary salt of N,N-dimethylaminopropylmethacrylamide (Monomer A), containing the luminol marker synthesized according to the procedure of either Example 1 or Example 2 was prepared in the following manner:

N-(chloroacetyl)-3-aminophthalhydrazide, 1.0 g (0.0039 mol), prepared according to Example 1, was suspended in approximately 25 mL of acetone in a 50 mL round bottom flask equipped with a magnetic stir bar. This mixture was heated to reflux, and enough dimethylformamide was added to just dissolve the luminol anilide. N,N-dimethylaminopropylmethacrylamide (Kohjin Co., LTD, Tokyo, Japan), 1.0 g (0.0059 mol) was dissolved in about 5 mL of acetone, along with 20 mg of hydroquinone monomethyl ether (Aldrich), and this solution was added to the reaction mixture. The reaction mixture was allowed to reflux for two hours, and then cooled to room temperature. The addition of diethyl ether to the reaction mixture caused the quaternary salt product to precipitate from solution, after which it was collected by filtration under anhydrous conditions (quantitative yield). The product is a hydroscopic, water soluble yellow powder.

EXAMPLE 4

A polymer incorporating the luminol tagged monomer synthesized according to the procedure of Example 3, a 90/10 mole ratio poly(acrylamide/DMAEA.BCQ) dispersion polymer tagged with Monomer A (Polymer A), was prepared in the following manner:

To a 1.5 liter resin reactor equipped with a stirrer, temperature controller and water condenser was added 423.53 g of deionized water, 213.02 g of a 49.5% solution of acrylamide (Nalco Chemical Company, Naperville, Ill.), 53.35 g of a 75% solution of dimethylaminoethyl acrylate benzyl chloride quaternary salt (DMAEA.BCQ, Nalco Chemical Co.), 0.3 g of Monomer A, 9 g of glycerol, 59 g of a 15% solution of a 90/10 DADMAC/DMAEA.BCQ copolymer (IV=2.0, Nalco Chemical Co.), 0.4 g of EDTA, and 157.5 g of ammonium sulfate. The mixture was heated to 48° C. and 1.0 g of a 1% solution of 2,2-azobis(2-amidinopropane) dihydrochloride (Wako Chemicals USA, Inc., Richmond, Va.) was added. The resulting solution was sparged with nitrogen at the rate of 1000 cc/min and stirred vigorously. After 15 minutes, the polymerization began and the solution became viscous. Over the next four hours, the temperature was maintained at 48° C. At two hours after initiation, 3 g of 1% solution of 2,2-azobis(2-amidinopropane) dihydrochloride was added. At three hours after initiation, 5.9 g of an 75% solution of DMAEA.BCQ was added. At fours after initiation, another 4 g of a 10% solution of 2,2-azobis(2-amidinopropane) dihydrochloride was added to the dispersion and the mixture was further reacted for 4 hours at 48° C. To this dispersion was then added 50 g of sodium sulfate, 10 g of sodium thiosulfate and 10 g of acetic acid. The resultant dispersion polymer had a Brookfield viscosity of 100 cP and a reduced specific viscosity of 16.9 dL/g at a polymer concentration of 450 ppm in 0.125 M $NaNO_3$, having approximately 0.043 mole percent of chemiluminescent tag. The same polymer was also prepared without Monomer A as a control (Polymer B).

EXAMPLE 5

The analytical technique utilized to determine the chemiluminescent response of the tagged monomer synthesized according to the procedure of Example 3 is as follows. Reagents were prepared for use in the detection of the chemiluminescent response as follows:

A) One liter of 0.1 M sodium carbonate buffer pH 1.2 containing 0.026 g of $CuSO_4.5H_2O$ was prepared in a volumetric flask. The solution was filtered through a 0.45 μm filter before use.

B) A 0.025–0.25 M solution of hydrogen peroxide was prepared by diluting 0.25 mL or 2.5 mL of a 30% hydrogen peroxide solution to 100 mL with water.

C) Approximately 5% sodium hypochlorite solution

The chemiluminescent response of Monomer A was determined in the following manner: Monomer A (Example 3) was diluted with water to the concentrations indicated in Table I.

Two grams of the dilute monomer A solution was placed into a 4 mL cuvette. Two tenths of a milliliter of the carbonate buffer and 0.1 to 0.2 mL of the hydrogen peroxide solution were added to the sample solution. The cuvette was then placed into a Hitachi F-4500 fluorometer, in a dark chamber. With the detector on but the excitation source off, 0.6 mL of the sodium hypochlorite solution was added to the sample with a syringe in such a fashion so as not to admit light into the sample chamber. The chemiluminescent emission produced by the Monomer A was recorded by the detector. The intensity of the emission (peak height or area) was proportional to the concentration of Monomer A (Table I).

TABLE I

Chemiluminescent Response from Solutions of Monomer A

| Monomer | Concentration (ppm) | Luminescent Peak Area |
|---|---|---|
| none | 0 | 0 |
| Monomer A | 0.033 | 197 |
| Monomer A | 0.139 | 446 |
| Monomer A | 0.692 | 2045 |

EXAMPLE 6

The analytical techniques utilized to determine the chemiluminescent response of tagged polymers synthesized according to the procedure of Example 4 is as follows. Polymer A, tagged with Monomer A as indicated in Example 4, was diluted with water to the concentrations indicated in Table II. Non-tagged Polymer B was diluted with water to a concentration of 1360 ppm.

Two grams of the dilute polymer solution was placed into a 4 mL cuvette. Two tenths of a milliliter of the carbonate buffer and 0.1 to 0.2 mL of the hydrogen peroxide solution were added to the sample solution. The cuvette was then placed into a Hitachi F-4500 fluorometer, in a dark chamber. With the detector on but the excitation source off, 0.6 mL of sodium hypochlorite solution was added to the sample with a syringe in such a fashion so as not to admit light into the sample chamber. The chemiluminescent emission produced by Polymer A was recorded by the detector. The intensity of the emission (peak height or area) was proportional to the concentration of the polymer A (Table II).

No chemiluminescent signal was detected for the untagged Polymer B.

TABLE II

Chemiluminescent Response from Solutions of Polymers A and B

| Polymer | Concentration (ppm polymer) | Luminescent Peak Area |
|---|---|---|
| none | 0 | 0 |
| Polymer A | 10 | 28 |
| Polymer A | 49 | 107 |
| Polymer A | 98 | 217 |
| Polymer A | 490 | 1062 |
| Polymer A | 980 | 2099 |
| Polymer B | 1360 | 0 |

In order to verify incorporation of the luminol monomer into the polymer, a 1.0 g sample of Polymer A was precipitated in approximately 20 mL of methanol. After decanting the methanol layer, the polymer precipitates were washed three times with methanol. All fractions were then analyzed for polymer content using a colloid titration technique. The polymeric precipitate was also checked for chemiluminescence and compared to the original sample's chemiluminescent for material balance purpose. These data are summarized in Table III.

TABLE III

Precipitation of Polymer A in Methanol

| | Polymer Content | | Luminescent |
|---|---|---|---|
| Polymer A Fraction | weight (g) | % in fraction | Peak Area |
| polymer precipitates | 0.1216 | 69 | 602 |
| polymer precipitates (late) | 0.027 | 15.3 | 290 |
| methanol soluble materials | 0.0276 | 15.7 | 1143 |
| Total | 0.176 | 100 | 2035 |
| Polymer A (non-precipitated) | 0.150 | 100 | 2199 |

As can be seen by inspection of Table III, approximately 80% of the polymeric materials were precipitated from solution with methanol, and these precipitated polymers exhibited approximately 50% of the total chemiluminescent response, demonstrating incorporation of the luminol monomer into the backbone of high molecular weight polymer. Approximately 16% of the polymer materials were soluble in methanol, and these presumably lower molecular weight polymers were responsible for about 50% of the total chemiluminescent response.

EXAMPLE 7

In order to demonstrate one of the chief virtues polymers tagged with Monomer A, the chemiluminescent response from Polymer A was detected in water with a high level of fluorescent background.

One hundred ppm of Polymer A (~15 ppm active tagged polymer) was added to deionized water, two different wastewater samples, and a solution of 1400 ppm pyrenetetrasulfonic acid (PTSA) in water as indicated in Table IV. These samples were then measured for chemiluminescence using the procedure described in Example 5.

TABLE IV

Detection of Polymer A in Various Media

| Sample Matrix | Luminescent Peak Area |
| --- | --- |
| Deionized Water | 243 |
| Papermill Basin Outlet Wastewater | 149 |
| Papermill Effluent Wastewater | 257 |
| 1400 ppm of PTSA solution | 259 |

The results compiled in Table IV show that Polymer A can be detected in paper mill effluent wastewaters without interferences from the fluorescent background of the wastewater. Deionized water is taken as the blank, wherein no fluorescence is expected. Both types of papermill waste water, as well as the PTSA solution contain fluorescence. That chemiluminescence of the tagged polymer is the same whether or not there is competing fluorescence in the test sample is evident from the values obtained for the effluent waste water and the PTSA solution, which are within the range of the deionized water, accounting for experimental error. Moreover, though the number obtained for the basin outlet waste water is lower than for the blank, this can be accounted for by the fact that some of the polymer has reacted with the waste water and thus precipitated out of solution. The lower number is not the result of interference by fluorescent materials. Therefore, Table IV illustrates that highly fluorescent aromatic materials such as pyrenetetrasulfonic acid do not interfere with detection of the chemiluminescent signal.

EXAMPLE 8

In order to demonstrate the utility of polymer tagged using Monomer A for tracking the location of the treatment polymer, a free drainage test was performed as follows.

A 1% solution of Polymer A was dosed at varying amounts into 250 mL of a local municipal sludge in a 500 mL cylinder. After several inversions to mix the polymer and flocculate the sludge particles, free drainage (in mL) after 10 seconds through a fine screen was measured. Residual polymer levels in the filtrate were then determined using the chemiluminescent measurement technique described in Example 5. These data are summarized in Table V. These results demonstrate that the chemiluminescent response derived from polymers tagged with Monomer A can be used to monitor polymer location and concentration in wastewater applications, and moreover that such tagged polymers are useful for flocculation, wherein the presence of the tag does not preclude the activity of the water treatment polymer, in that flocculation did occur.

TABLE V

Residual Polymer A in Sludge Dewatering Filtrates

| Product Dosage[1] | Filtrate Luminescent Peak Area |
| --- | --- |
| 4 | 757 |
| 6 | 1068 |
| 8 | 1335 |
| 10 | 1636 |

TABLE V-continued

Residual Polymer A in Sludge Dewatering Filtrates

| Product Dosage[1] | Filtrate Luminescent Peak Area |
| --- | --- |
| 12 | 1928 |
| 14 | 1990 |

[1] = number of mL of a 1% solution of Polymer A

EXAMPLE 9

One of the primary uses of water soluble polymers is as flocculants to aid in the separation of solids from liquids or in the separation of one insoluble liquid from another. This essential separation step is included in such varied operations as papermaking, coal and mineral processing, sludge dewatering, and emulsion breaking. From this perspective, all industrial or municipal solid/liquid or liquid/liquid separation schemes share several common features, regardless of whether the intention is to increase the efficiency of a process operation or to treat a wastewater stream for reclamation.

For example, the water to be treated with the polymeric additive contains suspended solid or liquid particles and colloidal materials which are to be separated from the water. The solids removed from the water are either retained or discarded, depending on the objective, and the water is either recycled or discharged. The polymeric additive is fed to this stream, and then this mixture is typically mixed in a flocculation tank to effect interaction of the polymer with the particles and promote floc formation. The flocculated sludge or slurry is then sent to a mechanical separation device such as a filter, screen, belt press, centrifuge, dissolved air flotation (DAF) device, clarifier or the like, wherein the solid materials are separated from the water. The effectiveness of the polymeric treatment is generally related to one or more qualitative or quantitative parameters of the separated solids or water such as the drainage (water removal) rate or the turbidity of the water.

Therefore, as concerns the present invention, the polymer tagged with the chemiluminescent indicator could be fed to the process or wastewater stream normally, in the same manner as conventional polymeric treatment agents with no disruption to the process as it is practiced. After the separation of the solids from the water, a water sample could be removed or a side-stream diverted (for continuous monitoring purposes), treated with the activating reagents, and the intensity of the chemiluminescent response is measured. At the same time, some parameter of interest to the system could likewise be measured, such as drainage rate or water turbidity. Since the intensity of the chemiluminescent response is proportional to polymer concentration, a correlation between residual polymer concentration in the water and the effectiveness of the separation could be derived. After this correlation is established, the effectiveness of subsequent separations could be optimized by taking advantage of the derived correlation and either increasing or decreasing the amount of polymer fed to the original process or wastewater stream, for example.

EXAMPLE 10

Using the present invention, other applications in addition to those related to process control can be envisioned. For example, as the presence (or absence) of polymer is indicated by the generation (or lack thereof) of a luminescent response to the activating reagents, information regarding the concentration of the polymeric agent which may be present in effluents discharged to rivers or streams could also be provided. The ability to obtain such information is expected to become increasingly important as more stringent regulatory discharge requirements are implemented.

EXAMPLE 11

Another example of the utility of the present invention may be envisioned in the diagnosis of problematic processes or in troubleshooting of complex separation operations wherein such water soluble polymers are employed. Since the location and concentration of the polymeric additive can be determined accurately using the chemiluminescent response, fluid samples could be obtained, filtered and analyzed for the polymeric additive at any point in the process. In so doing, a systematic tracing of the system would be possible, potentially enabling identification and remediation of faults.

Changes can be made in the composition, operation and arrangement of the method of the present invention described herein without departing from the concept and scope of the invention as defined in the following claims:

What is claimed is:

1. A chemiluminescent monomer compound comprising: a vinylic monomer having a pendant amide-linked phthalhydrazide chemiluminescent group, wherein the chemiluminescent monomer is formed by reacting a vinylic monomer having a terminal amine group with an alpha-haloacetyl containing phthalhydrazide chemiluminescent group.

2. The chemiluminescent monomer compound of claim 1 wherein said phthalhydrazide chemiluminescent group is selected from the group consisting of: 5-amino-2,3-dihydro-1,4-phthalazinedione, 6-amino-2,3-dihydro-1,4-phthalazinedione and N-(4-aminobutyl)-N-ethyl-6-amino-2,3-dihydro-1,4-phthalazinedione.

3. The chemiluminescent monomer compound of claim 1 of formula

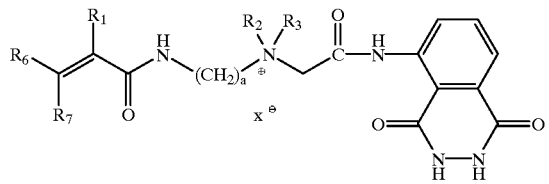

wherein a is an integer of from 1 to 10, $R_1$, $R_6$ and $R_7$ are selected from the group consisting of hydrogen and methyl groups, $R_2$ and $R_3$ are methyl groups and X is selected from the group consisting of chloride, iodide and bromide ions.

4. The chemiluminescent monomer compound of claim 3 that is N,N-dimethylaminopropylmethacrylamide-N-(chloroacetyl)-3-aminophthalhydrazide quaternary salt.

5. The chemiluminescent monomer compound of claim 1 of formula

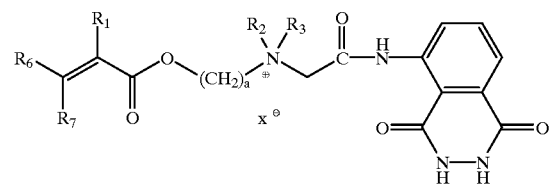

wherein a is an integer of from 1 to 10, $R_1$, $R_6$, and $R_7$ are selected from the group consisting of hydrogen and methyl groups, $R_2$ and $R_3$ are methyl groups and X is selected from the group consisting of chloride, iodide and bromide ions.

6. The chemiluminescent monomer compound of claim 1 wherein said vinylic monomer having a terminal amine group is selected from the group consisting of: dimethylaminoethyl acrylate and dimethylaminoethyl methacrylate.

7. A chemiluminescent water-soluble or water-dispersible polymer compound comprising: a chemiluminescent water-soluble polymer formed from free radical polymerization of at least a first chemiluminescent vinylic monomer and a second vinylic monomer, wherein said first monomer has a pendant amide-linked phthalhydrazide chemiluminescent group and wherein said first monomer is formed by reacting a vinylic monomer having a terminal amine group with an alpha-haloacetyl containing phthalhydrazide chemiluminescent group.

8. The polymer of claim 7 wherein said phthalhydrazide chemiluminescent group is selected from the group consisting of: 5-amino-2,3-dihydro-1,4-phthalazinedione, 6-amino-2,3-dihydro-1,4-phthalazinedione and N-(4-aminobutyl)-N-ethyl-6-amino-2,3-dihydro-1,4-phthalazinedione.

9. The polymer of claim 7 wherein said second monomer is selected from the group consisting of: acrylamide, acrylic acid, methacrylamide, vinyl acetate, dimethylaminoethyl acrylate methyl chloride quaternary salt, dimethylaminoethyl acrylate cetyl chloride quaternary salt, dimethylaminoethyl acrylate benzyl chloride quaternary salt, diallyldimethyl ammonium chloride, 2-acrylamido-2-methylpropane sulfonic acid, N-vinyl formamide, dimethylaminoethyl methacrylate methyl chloride quaternary salt, dimethylaminoethyl methacrylate cetyl chloride quaternary salt, dimethylaminoethyl methacrylate benzyl chloride quaternary salt, methacrylamidopropyl trimethyl ammonium chloride, acrylamidopropyl trimethyl ammonium chloride and combinations thereof.

10. The polymer of claim 7 wherein said polymer has a luminescent repeating mer unit represented by the formula

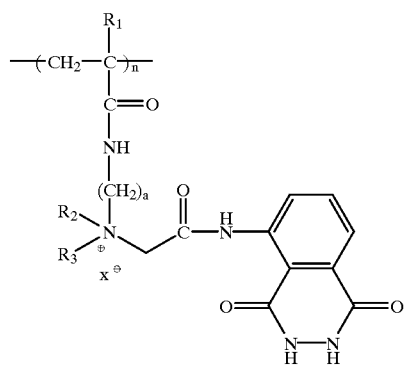

wherein a is an integer of from 1 to 10, $R_1$ is selected from the group consisting of hydrogen and methyl groups, $R_2$ and $R_3$ are methyl groups and X is selected from the group consisting of chloride, iodide and bromide ions and wherein said polymer also contains a remaining portion of randomly distributed vinylic mer units.

11. The polymer of claim 10 wherein said vinylic mer units are derived from monomers selected from the group consisting of acrylamide, acrylic acid, methacrylamide, vinyl acetate, dimethylaminoethyl acrylate methyl chloride quaternary salt, dimethylaminoethyl acrylate cetyl chloride quaternary salt, dimethylaminoethyl acrylate benzyl chloride quaternary salt, diallyldimethyl ammonium chloride, N-vinyl formamide, 2-acrylamido-2-methylpropane sulfonic acid, dimethylaminoethyl methacrylate methyl chloride quaternary salt, dimethylaminoethyl methacrylate cetyl chloride quaternary salt, dimethylaminoethyl methacrylate benzyl chloride quaternary salt, methacrylamidopropyl trimethyl ammonium chloride, acrylamidopropyl trimethyl ammonium chloride and combinations thereof.

12. The polymer of claim 10 wherein said luminescent mer unit is from about 0.001 to about 10 mole percent of said polymer, and said vinylic mer unit is from about 90 to 99.999 mole percent of said polymer.

13. The compound of claim 7 wherein said polymer is poly(acrylamide/dimethylaminoethylacrylate benzyl chloride quaternary salt/N,N-dimethylaminopropylmethacrylamide N-(chloroacetyl)-3-aminophthalhydrazide quaternary salt.

14. The compound of claim 7 wherein said polymer has a luminescent repeating mer unit represented by the formula

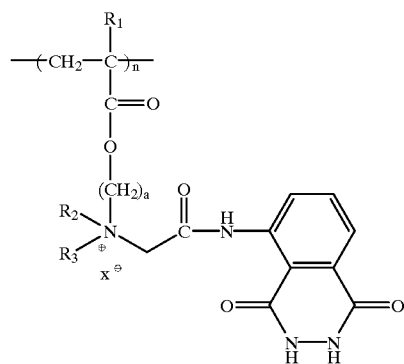

wherein a is an integer of from 1 to 10, $R_1$ is selected from the group consisting of hydrogen and methyl groups, $R_2$ and $R_3$ are methyl groups and X is selected from the group consisting of chloride, iodide and bromide ions and wherein said polymer also contains a remaining portion of randomly distributed vinylic mer units.

15. The polymer of claim 14 wherein said vinylic mer units are derived from monomers selected from the group consisting of: acrylamide, acrylic acid, methacrylamide, vinyl acetate, dimethylaminoethyl acrylate methyl chloride quaternary salt, dimethylaminoethyl acrylate cetyl chloride quaternary salt, dimethylaminoethyl acrylate benzyl chloride quaternary salt, diallyldimethyl ammonium chloride, N-vinyl formamide, 2-acrylamido-2-methylpropane sulfonic acid, dimethylaminoethyl methacrylate methyl chloride quaternary salt, dimethylaminoethyl methacrylate cetyl chloride quaternary salt, dimethylaminoethyl methacrylate benzyl chloride quaternary salt, methacrylamidopropyl trimethyl ammonium chloride, acrylamidopropyl trimethyl ammonium chloride and combinations thereof.

16. The polymer of claim 14 wherein said luminescent mer unit is from about 0.001 to about 10 mole percent of said polymer, and said vinylic mer unit is from about 90 to about 99.999 mole percent of said polymer.

17. The polymer of claim 7 wherein said first monomer having a terminal amine group is selected from the group consisting of: dimethylaminoethyl acrylate and dimethylaminoethyl methacrylate.

18. A method for increasing the efficiency of a water-soluble or water-dispersible polymeric flocculating agent in a fluid stream containing solids comprising the steps of:

a) incorporating a detectable chemiluminescent moiety into said polymeric agent by polymerizing one or more vinylic monomers to form said agent under free radical polymerization conditions, wherein at least one of said vinylic monomers has an amide-linked chemiluminescent pendant group, to form chemiluminescent polymer;

b) adding an effective flocculating amount of said chemiluminescent agent to said fluid stream;

c) flocculating said solids from said solids containing stream to form a clarified stream;

d) separating flocculated solids from said clarified fluid stream; and then, e) determining amount of chemiluminescent agent present in said clarified stream with chemiluminescent analytical techniques, whereby concentration of said agent in said clarified stream indicates that a modification in dosage selected from the group consisting of: increasing, decreasing, and not changing said dosage should be made.

19. The method of claim 18 wherein said fluid stream is an aqueous stream and said chemiluminescent polymer contains repeating chemiluminescent mer units of the formula selected from the group consisting of:

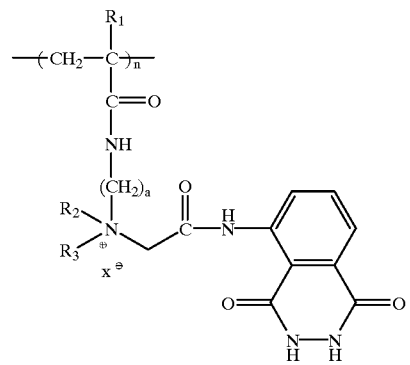

and

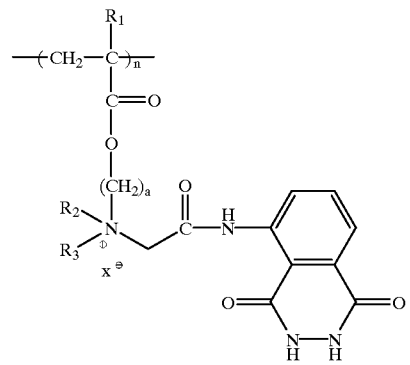

wherein a is an integer of from 1 to 10, $R_1$ is selected from the group consisting of hydrogen and methyl groups, $R_2$ and $R_3$ are methyl groups and X is selected from the group consisting of chloride, iodide and bromide ions and wherein the polymer also contains a remaining portion of randomly distributed vinylic mer units.

20. The method of claim 18 wherein said vinylic mer units are derived from monomer selected from the group consisting of: acrylamide, acrylic acid, methacrylamide, vinyl acetate, dimethylaminoethyl acrylate methyl chloride quaternary salt, dimethylaminoethyl acrylate cetyl chloride quaternary salt, dimethylaminoethyl acrylate benzyl chloride quaternary salt, diallyldimethyl ammonium chloride, N-vinyl formamide, 2-acrylamido-2-methylpropane sulfonic acid, dimethylaminoethyl methacrylate methyl chloride quaternary salt, dimethylaminoethyl methacrylate cetyl chloride quaternary salt, dimethylaminoethyl methacrylate benzyl chloride quaternary salt, methacrylamidopropyl trimethyl ammonium chloride, acrylamidopropyl trimethyl ammonium chloride and combinations thereof.

21. The method of claim 18 wherein said chemiluminescent mer unit is from about 0.001 to about 10 mole percent of said polymer, and said vinylic mer unit is from about 90 to about 99.999 mole percent of said polymer.

22. The method of claim 18 wherein said chemiluminescent polymer is poly(acrylamide/dimethylaminoethylacrylate benzyl chloride quaternary salt/N,N-dimethylaminopropylmethacrylamide N-(chloroacetyl)-3-aminophthalhydrazide quaternary salt.

* * * * *